US012804508B2

(12) United States Patent
Phan et al.

(10) Patent No.: US 12,804,508 B2
(45) Date of Patent: Nov. 17, 2026

(54) METHOD FOR REPLACING BY A HPLMN OR A USER EQUIPMENT A SET OF URSP RULES USED BY SAID USER EQUIPMENT AND CORRESPONDING SECURE ELEMENT

(71) Applicant: THALES DIS FRANCE SAS, Meudon (FR)

(72) Inventors: Ly Thanh Phan, Le Plessis Robinson (FR); Vincent Dany, Aubagne (FR); Jean-François Gros, Marseilles (FR); Jérôme Voyer, Auriol (FR)

(73) Assignee: THALES DIS FRANCE SAS, Meudon (FR)

( * ) Notice: Subject to any disclaimer, the term of this patent is extended or adjusted under 35 U.S.C. 154(b) by 251 days.

(21) Appl. No.: 18/712,307

(22) PCT Filed: Nov. 16, 2022

(86) PCT No.: PCT/EP2022/082146
§ 371 (c)(1),
(2) Date: May 22, 2024

(87) PCT Pub. No.: WO2023/094239
PCT Pub. Date: Jun. 1, 2023

(65) Prior Publication Data

US 2025/0016650 A1 Jan. 9, 2025

(30) Foreign Application Priority Data

Nov. 25, 2021 (EP) .................................... 21306641

(51) Int. Cl.

| | |
|---|---|
| ***H04W 40/02*** | (2009.01) |
| ***H04W 48/16*** | (2009.01) |
| *H04W 84/04* | (2009.01) |

(52) U.S. Cl.
CPC .......... *H04W 40/02* (2013.01); *H04W 48/16* (2013.01); *H04W 84/042* (2013.01)

(58) Field of Classification Search
CPC .............................. H04W 40/02; H04W 48/16
See application file for complete search history.

(56) References Cited

U.S. PATENT DOCUMENTS

2023/0189187 A1* 6/2023 Velev .................... H04W 48/20 455/435.1
2024/0323825 A1* 9/2024 Salkintzis ............ H04W 48/18

FOREIGN PATENT DOCUMENTS

CN 111698725 * 9/2020 ............ H04W 28/02
CN 111698725 A 9/2020

(Continued)

OTHER PUBLICATIONS

International Search Report (PCT/ISA/210) and Written Opinion (PCT/ISA/237) mailed on Feb. 7, 2023, by the European Patent Office as the International Searching Authority for current International Application No. PCT/EP2022/082146—[13 pages].

(Continued)

*Primary Examiner* — Myron Wyche

(57) ABSTRACT

A method for replacing by a HPLMN or a user equipment a set of URSP rules used by the user equipment communicating with a MNO network, the set of URSP rules being called current set of URSP rules, by another set of URSP rules, called new set of URSP rules, the user equipment cooperating with a secure element, the method including storing in the secure element a plurality of URSP rules; when the home network or the user equipment decides to switch from the current set of rules to the new set of rules, sending to the secure element a switching command comprising a list of selection criteria of the new set of URSP rules; replacing in (Continued)

the secure element the current set of URSP rules by the new set of URSP rules, and sending a refresh command.

6 Claims, 1 Drawing Sheet

(56) References Cited

FOREIGN PATENT DOCUMENTS

| | | | |
|---|---|---|---|
| WO | 2021056576 | A1 | 4/2021 |
| WO | 2021187913 | A1 | 9/2021 |

OTHER PUBLICATIONS

Motorola Mobility et al: "Handling of a PDU session used for BDT traffic", 3GPP Draft; S2-1905585_DP_XBDT_VALIDATION, 3rd Generation Partnership Project (3GPP), Mobile Competence Centre; vol. SA WG2, No. Reno, USA; May 13, 2019-May 17, 2019; May 7, 2019 (May 7, 2019), XP051721057, Retrieved from the Internet: URL:http://www.3gpp.org/ftp/tsg%5Fsa/WG2%5FArch/TSGS2%5F133%5FReno/Docs/S2%2D1905585%2Ezip; [retrieved on May 7, 2019]; pp. 1-2.

Motorola Mobility et al: "WLAN SSID as validity condition for WLAN offload in URSP rules", 3GPP Draft; S2-186757_URSP_SSID, 3rd Generation Partnership Project (3GPP), Mobile Competence Centre; vol. SA WG2, No. Vilnius, Lithuania; Jul. 2, 2018-Jul. 6, 2018; Jul. 1, 2018 (Jul. 1, 2018), XP051469902, Retrieved from the Internet: URL:http://www.3gpp.org/ftp/Meetings%5F3GPP%5FSYNC/SA2/Docs [retrieved on Jul. 1, 2018]; pp. 1-6.

* cited by examiner

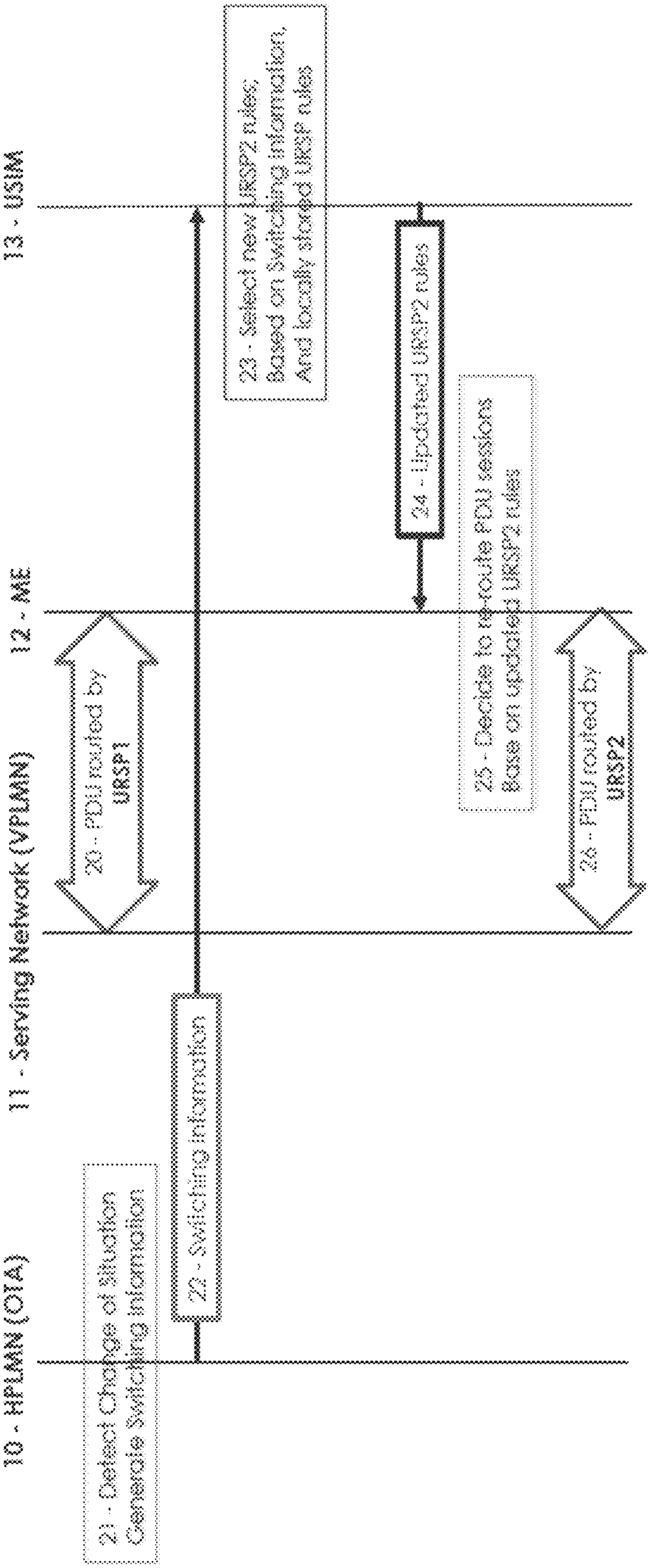
10 - HPLMN (OTA)
11 - Serving Network (VPLMN)
12 - ME
13 - USIM
20 - PDU routed by URSP1
21 - Detect Change of Situation
Generate Switching information
22 - Switching information
23 - Select new URSP2 rules;
Based on Switching information,
And locally stored URSP rules
24 - Updated URSP2 rules
25 - Decide to re-route PDU sessions
Base on updated URSP2 rules
26 - PDU routed by URSP2

METHOD FOR REPLACING BY A HPLMN OR A USER EQUIPMENT A SET OF URSP RULES USED BY SAID USER EQUIPMENT AND CORRESPONDING SECURE ELEMENT

TECHNICAL FIELD

The present invention concerns telecommunications and more precisely the administration over the air (OTA) of secure elements like Sim cards, UICCs, embedded secure elements (eUICCs) and preferably integrated UCCIs (iUICCs) and also associated services.

BACKGROUND

The invention enters in the scope of 5G connectivity service, named as PDU Session. A PDU session is very similar to an EPS bearer in LTE, except for the QoS model and the supported user data. In transport point of view, a PDU session is made by a sequence of NG (New Generation) tunnels in 5G Core, and of one or more radio bearers on the radio interface. For URSP (UE Route Selection Policy), with UE being a User Equipment, the UE can be provisioned with URSP information which provides information on which PDU Session on network slice a given service or application should use when it is activated.

URSP rules allow a Home Operator (Home MNO—Mobile Network Operator) to route PDU session (data connections) on a visited/home PLMN basis, in order to optimize costs, resources and quality of service, depending on the type of connectivity or applications used by the end user with his UE.

URPS rules can be stored in the USIM (secure element) and managed by an OTA platform. The problem is that if although URSP rules are generally different per visited PLMN (VPLMN), only the rules that apply to the HPLMN (Home PLMN) are used when stored in the USIM. In consequence, URSP rules are only based on the visited PLMN and may not be adapted to the current network conditions, localization of the end-user, needs of the end-user, requested QoS (Quality of Service), . . . .

So, priorities associated to the URSP rules are global and do not always match the situation (network conditions, application QoS required at the specific moment e.g. football match, online games, Internet access, . . . ).

The URSP rules defined for a given user may then not be in line with the expected user's expectations.

SUMMARY

The present invention proposes a solution to this problem.

More precisely, the invention proposes a method for replacing by a HPLMN or a user equipment a set of URSP rules used by the user equipment communicating with a MNO network, the set of URSP rules being called current set of URSP rules, by another set of URSP rules, called new set of URSP rules, the user equipment cooperating with a secure element, the method comprising:

- Storing in the secure element a plurality of URSP rules;
- When the home network or the user equipment decides to switch from the current set of rules to the new set of rules, sending respectively from the HPLMN or the user equipment to the secure element a switching command comprising a list of selection criteria of the new set of URSP rules;

- Upon receiving the switching command, replacing in the secure element the current set of URSP rules by the new set of URSP rules based on the list of selection criteria, and
- Sending from the secure element to the user equipment a refresh command in order that the user equipment connects to the MNO network according to the new set of URSP rules.
- In a preferred embodiment, the MNO network is the HPLMN.
- As an alternative, the MNO network is a VPLMN and the switching command is sent to the user equipment through the VPLMN.
- Preferably, the list of selection criteria comprises at least one of the following criteria:
- Localization of the user equipment;
- A time period;
- The QoS required by the user equipment;
- A category of the user of the user equipment;
- The PLMN to which the user equipment is connected;
- The application used by the user of the user equipment.

The invention also concerns a secure element cooperating with a user equipment and comprising a plurality of URSP rules, the secure element being configured for replacing by a HPLMN or the user equipment a set of URSP rules used by the user equipment communicating with a MNO network, the set of URSP rules being called current set of URSP rules, by another set of URSP rules, called new set of URSP rules, the secure element being configured for receiving from the HPLMN or the user equipment a switching command comprising a list of selection criteria of the new set of URSP rules when the home network or the user equipment decides to switch from the current set of rules to the new set of rules, and, upon receiving the switching command, replacing in the secure element the current set of URSP rules by the new set of URSP rules based on the list of selection criteria, and sending from the secure element to the user equipment a refresh command in order that the user equipment connects to the MNO network according to the new set of URSP rules.

For this secure element, the list of selection criteria comprises at least one of the following criteria:

- Localization of the user equipment;
- A time period;
- The QoS required by the user equipment;
- A category of the user of the user equipment;
- The PLMN to which the user equipment is connected;
- The application used by the user of the user equipment.

DESCRIPTION OF THE DRAWINGS

FIG. 1 shows a flowchart of exchanges between different entities.

DETAILED DESCRIPTION

The invention will be better understood by reading the following description of a preferred embodiment of the invention that describes the unique FIGURE showing a flowchart of the exchanges between different entities. Another embodiment is also further described.

The purpose of the invention is to provide a method for adapting URSP rules for each end-user of a mobile equipment (or fixed equipment like a M2M device for example), in function of his real needs. The URSP rules are stored in the secure element of his terminal/mobile equipment.

For example, an end-user connected to a VMNO with his equipment has certain habits, like for example hearing music on YouTube™ or playing Internet games at given hours or given days. This does not need a low latency for the serving network (VPLMN).

The URSP rules stored in the secure element of his equipment are not necessarily adapted to these habits. The rules of the URSP have therefore to be updated.

One possible solution would be to switch from a given URSP set of rules to another URSP set of rules but this is not adapted to the behavior of the user who can suddenly choose to drive his car and therefore needs a low latency for his V2X equipment (connected to the same secure element) for security reasons.

Therefore, the present invention proposes to consider the end-user at a higher level than in the state of the art, by modifying the URSP rules in function of the real situation of the end-user (to which VPLMN he is connected, the available bandwidth of the slice he is using, the used DNN (a DNN is a Data Network Name corresponding to an APN (Access Point Name) in 5G), the QoS he is expecting for the application he is using, taking in account that gamers do not use their terminals on peak hours, . . . ).

For this purpose, in regard of the unique FIGURE, the invention proposes the following method. In the FIGURE, several entities are represented:

A HPLMN 10 having an OTA platform for communicating with a secure element (USIM 13) cooperating with a Mobile Equipment 12. The HPLMN 10 communicated with this secure element 13 through a serving network 11, a VPLMN.

At a first step 20, PDU rules are routed from the VPLMN 11 to the ME 12. These rules are stored in the secure element 13. The ME 12 is then provisioned with URSP information which provides information on which PDU Session on network slice a given service or application should use when it is activated.

At step 21, the HPLMN that is always connected to the VPLMN 11, detects a condition of change of situation of the ME 12. This condition of change can be for example one or a plurality of the following conditions:

- The HPLMN 10 detects an obsolescence of the current set of URSP rules that can be based on a validity period associated to the URSP rules for this secure element subscription;
- For a given secure element subscription or group of secure element subscriptions, upon detection by the HPLMN 10 of obsolescence of the URSP rules for the subscriptions or that the current URSP rules cannot provide the required Quality of Experience:
- The HPLMN 10 detects that the current URSP rules of the secure element subscription cannot provide the required Quality of Service: it can be based for instance on change of location of the mobile device or change in the network use conditions or change in required QoS for e.g. the USIM subscription or for some application or services accessed by the subscription;
- The localization of the ME 12 has changed. The VPLMN is therefore no more the same;
- A time period where the user currently will begin using an application has been reached or the end-user has just began using this application. The user then for example has the habit to play games on Internet and he needs a low latency and a broad bandwidth. If he was previously in sleeping mode or only having a call, this means that the VPLMN will have to give him another slice in order to improve the QoS required by his user equipment;
- The user of the equipment belongs to a privileged category of users (VIP). This user will have privileges in terms of QoS, bandwidth, . . . compared to other users;
- The VPLMN to which said user equipment is connected is overloaded.

In such case of change of situation, the HPLMN 10 generates a so called "switching information" or "switching command" at step 22 and sends it to the secure element 13 through the VPLMN 11 and the ME 12.

Such a switching information or switching information contains a list of selection criteria of the new set of URSP rules, the secure element 13 being provisioned by the set of URSP rules sent at step 20, being called current set of URSP rules, by a new set of URSP rules, called new set of URSP rules.

The current set of URSP rules, containing a plurality of URSP rules, can thus be modified, by changing one or more new URSP rules.

The switching command does not indicate which URSP rules have to be applied by the secure element but only selection criteria indicating which needs are expected by the end user. It permits to lower the amount of the size of all the existing rules, letting the secure element, thanks to an embedded software, to select new rules to be applied by the ME 12.

For example, if the user was using Internet or Youtube, it is then possible to realize a local breakout for choosing by the VPLMN 11 a default DNN. If the user is using Netflix, another DNN will be used.

When the secure element is an iUICC (integrated UICC), there is plenty of space for storing URSP rules. The URSP stores the description of the communication (origin and destination, it is a traffic descriptor). This means that the URSP knows which application is used by the user, which OS (Operating System) is used, which service is required (IMS, video, voice, . . . ). It is the ME 12 that then selects, in regard of the URSP database of the secure element 13 to which it has access, which rule he will apply for responding to the criteria (thanks to his rooting selector). For example, for a given criteria, the ME 12 will decide to choose slice A with a DNN XYZ for accessing to a given service requested by the user.

So, in summary, the invention proposes to simply send selection criteria of rules (time, localization, . . . ) to the secure element 13, without any indication of the rule(s) to be used, and the secure element 13 decides which rules it will furnish to the ME 12 for corresponding to these criteria.

At step 23, the secure element 13 selects new rules (indicated as URSP2). These rules are based on the switching information 22 and stored locally in the URSP rules of the secure element 13. Thus, the secure element 12, upon receiving the switching command, replaces the current set of URSP rules (URSP1) by the new set of URSP rules (URSP2) based on the list of selection criteria.

The updated URSP2 rules are then sent to the ME 12 at step 24 that decides at step 25 to re-route PDU sessions based on these new rules URSP2. The serving network 11 can then enter in communication with the ME 12 by using these new URSP2 rules at step 26.

For this step, the secure element 13 sends to the user equipment 12 a refresh command in order that the user equipment 12 connects to the MNO network according to the new set of URSP rules URSP2.

In this example, the MNO network is a VPLMN and in the said switching command is sent to the user equipment through the VPLMN. But in another embodiment, the serving network to which the ME 12 is attached can be the HPLMN 10.

It is of course also possible to update via OTA the rules stored in the secure element 13.

It is also possible that the HPLMN 10 has pre-configured in advance a plurality of sets of rules and switch conditions. In this respect, the sending of a switching command by the HPLMN 10 may not be necessary, as the ME 12 can detect a change.

This change can be (detected by the HPLMN 10 or by the ME 12) one of:

Localization of the user equipment;

A time period begins;

The QoS required by the user equipment;

The PLMN to which the user equipment is connected;

The application used by the user of the user equipment.

To illustrate one of these examples, for example the localization of the ME 12: The ME 12 detects a localization change and triggers itself the change of rules, based on this localization change. The ME then sends a switching command to the secure element 12 comprising a list of selection criteria of the new set of URSP rules. The HPLMN 10 is here inactive.

The secure element 13 comprises an applet that selects the rules to be applied in function of the criteria of rules.

In summary:

The HPLMN 10 can send to the secure element 13, through the serving network 11 (if the HPLMN 10 is not the serving network 11) a switching command for changing the set of rules to be used by the ME 12;

The ME 12 can send this switching command without intervention of the HPLMN 10.

In both cases, the switch is decided when one of the aforementioned conditions is met.

The invention also concerns a secure element 13 cooperating with a user equipment 12 and comprising a plurality of URSP rules, the secure element 13 being configured for replacing by a HPLMN 10 or the user equipment 12 a set of URSP rules used by the user equipment 12 communicating with a MNO network, the set of URSP rules being called current set of URSP rules, by another set of URSP rules, called new set of URSP rules, the secure element 13 being configured for receiving from the HPLMN 10 or the user equipment 12 a switching command comprising a list of selection criteria of the new set of URSP rules when the home network or the user equipment 12 decides to switch from the current set of rules to the new set of rules, and, upon receiving the switching command, replacing in the secure element 13 the current set of URSP rules by the new set of URSP rules based on the list of selection criteria, and sending from the secure element 13 to the user equipment 12 a refresh command in order that the user equipment 12 connects to the MNO network according to the new set of URSP rules.

Thanks to the invention, the HPLMN 10 (or the ME 12) is able to:

Have a better control over the URSP rules used by the ME 12 independently from what has been previously stored in the ME 12;

Leverage on his (their) OTA platforms and secure element's assets without relying on new PCF (Policy Control Function) based solution;

Provide the URSP rules adapted to the network conditions, QoS requirement at the moment;

Minimize the network traffic for URSP rules management and optimize secure element memory usage;

The volume of data sent to the secure element 13 by the HPLMN 10 is reduced to the size of the PLMN-Id (few bytes);

The business information in the URSP rules is not revealed during transit to the Visited Network 11 knowledge as Secure Packets are encrypted do not contain actual URSP rules;

The battery consumption of the ME 12 is minimized as the volume of data sent to the ME 12 is minimal even when there are a lot of connections to different Visited Networks;

The Visited Network 11 cannot discard the information sent to the UE (ME 12+USIM 13) either because information sent by the Home Network 10 to the UE is expected by the UE as specified in 3GPP TS 23.122;

The Visited Network 11 cannot modify the Secured Packet sent from the Home Network 10 to the UE (12+13) as the message is integrity protected;

The network radio resources used by the proposed solution may be reduced:

To nothing in the case of local detection of the Visited Network 11 by the ME 12;

Or reduced to few bytes in the primary case whereas the Home PLMN 10 sends a Visited Network identifier to the UE (12+13) in a Secure Packet.

Additionally, a Home Network 10 can deploy the proposed solution even when the Visited Network 11 is of older release than Release 15, as long as the ME 12 supports URSP.

The invention claimed is:

1. A method for replacing by a home public land mobile network (HPLMN) or a user equipment (UE) a set of UE Route Selection Policy (URSP) rules used by said user equipment communicating with a mobile network operator (MNO) network, said set of URSP rules called current set of URSP rules, by another set of URSP rules, called new set of URSP rules, said user equipment cooperating with a secure element, said method comprising:

Storing in said secure element a plurality of URSP rules;

When said home network or said user equipment decides to switch from said current set of rules to said new set of rules, sending respectively from said HPLMN or said user equipment to said secure element a switching command comprising a list of selection criteria of said new set of URSP rules, wherein said switching command does not indicate which URSP rules have to be applied by said secure element but only said selection criteria indicating which needs are expected;

Upon receiving said switching command, selecting by said secure element said new set of URSP rules from said plurality of URSP rules based on said list of selection criteria, and replacing in said secure element said current set of URSP rules by said new set of URSP rules, and Sending from said secure element to said user equipment a refresh command in order that said user equipment connects to said MNO network according to said new set of URSP rules.

2. The method according to claim 1 wherein said MNO network is said HPLMN.

3. The method according to claim 1 wherein said MNO network is a VPLMN and in that said switching command is sent to said user equipment through said VPLMN.

4. The method according to claim 1, wherein said list of selection criteria comprises at least one of the following criteria:

Localization of said user equipment;

A time period;

The QoS required by said user equipment;

A category of the user of said user equipment;

The PLMN to which said user equipment is connected;

The application used by said user of said user equipment.

5. A secure element cooperating with a user equipment (UE) and comprising a plurality of UE Route Selection Policy (URSP) rules, said secure element configured for replacing by a home public land mobile network (HPLMN) or said user equipment a set of URSP rules used by said user equipment communicating with a mobile network operator (MNO) network, said set of URSP rules called current set of URSP rules, by another set of URSP rules, called new set of URSP rules, said secure element configured for receiving from said HPLMN or said user equipment a switching command comprising a list of selection criteria of said new set of URSP rules, wherein said switching command does not indicate which URSP rules have to be applied by said secure element but only said selection criteria indicating which needs are expected when said home network or said user equipment decides to switch from said current set of rules to said new set of rules, and, upon receiving said switching command, selecting said new set of URSP rules from said plurality of URSP rules based on said list of selection criteria, and replacing in said secure element said current set of URSP rules by said new set of URSP rules, and sending from said secure element to said user equipment a refresh command in order that said user equipment connects to said MNO network according to said new set of URSP rules.

6. The secure element according to claim 5, wherein said list of selection criteria comprises at least one of the following criteria:

Localization of said user equipment;

A time period;

The QoS required by said user equipment;

A category of the user of said user equipment;

The PLMN to which said user equipment is connected; and

The application used by said user of said user equipment.

* * * * *